United States Patent [19]

Taylor

[11] Patent Number: 4,877,226

[45] Date of Patent: Oct. 31, 1989

[54] FLUID SHOCK ABSORBER CONSTRUCTIONS

[75] Inventor: Paul H. Taylor, Grand Island, N.Y.

[73] Assignee: Tayco Developments, Inc., North Tonawanda, N.Y.

[21] Appl. No.: 338,409

[22] Filed: Apr. 12, 1989

Related U.S. Application Data

[63] Continuation of Ser. No. 125,297, Nov. 25, 1987, abandoned.

[51] Int. Cl.⁴ .............................................. F16F 11/00
[52] U.S. Cl. ...................................... 267/196; 16/66;
188/271; 188/297; 188/301; 188/322.13;
188/322.19; 188/322.22; 267/64.26; 267/202;
267/216
[58] Field of Search ............... 188/297, 271, 301, 319,
188/320, 129, 285, 322.13, 322.19, 322.22, 285;
267/196, 216, 34, 202, 64.26; 16/66

[56] References Cited

U.S. PATENT DOCUMENTS

| | | | |
|---|---|---|---|
| 1,169,538 | 1/1916 | Heber | 16/66 |
| 1,212,322 | 1/1917 | Buckingham | 188/319 |
| 1,304,585 | 5/1919 | McFarland | 188/285 |
| 1,353,218 | 9/1920 | Coffman | 16/66 |
| 1,675,980 | 7/1928 | Lebharz | 16/66 |
| 1,916,571 | 7/1933 | Hoffman | 16/66 |
| 2,812,533 | 11/1959 | Falk | 188/297 X |
| 2,996,155 | 8/1961 | Priesemuth | 188/301 X |
| 3,059,916 | 10/1962 | Fahlbusch et al. | 188/129 X |
| 3,131,420 | 5/1964 | Quinn | 16/66 |
| 3,249,961 | 5/1966 | Quinn | 16/66 |
| 3,708,826 | 1/1973 | Larson | 16/66 X |
| 3,713,516 | 1/1973 | Freyler | 188/129 |
| 4,318,535 | 3/1982 | Imai | 267/34 |
| 4,729,458 | 3/1988 | Bauer et al. | 188/271 X |

FOREIGN PATENT DOCUMENTS

| | | | |
|---|---|---|---|
| 700009 | 2/1931 | France | 188/320 |
| 579093 | 1/1958 | Italy | 188/322.19 |

*Primary Examiner*—George E. A. Halvosa
*Attorney, Agent, or Firm*—Joseph P. Gastel

[57] ABSTRACT

A fluid shock absorber of either the pneumatic or liquid type having a frustoconical threaded bleed plug for varying the shock absorbing capacity of the shock absorber. A shock absorber construction utilizing air or liquid having a piston which is expandable whereby expansion to the associated cylinder wall exerts a frictional resistance proportional to the variation in back pressure resulting from the variable restricted flow past the frustoconical bleed plug. A liquid-type shock absorber having a self-contained chamber and a frustoconical bleed plug arrangement wherein liquid from the cylinder is forced into the chamber through the frustoconical bleed plug arrangement. In certain embodiments the bleed arrangement is located in the cylinder wall, and in another embodiment it is located in the piston head.

29 Claims, 6 Drawing Sheets

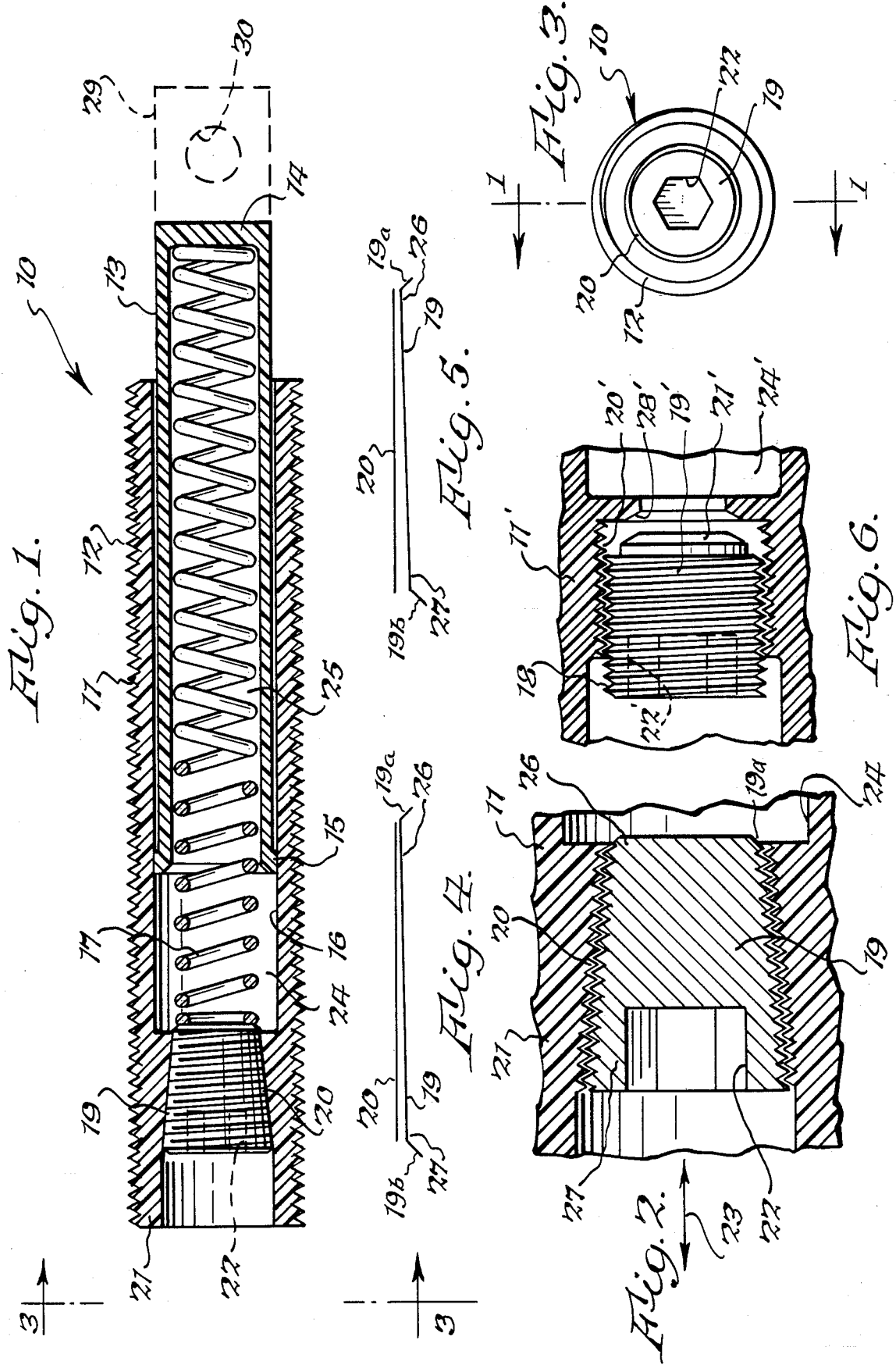

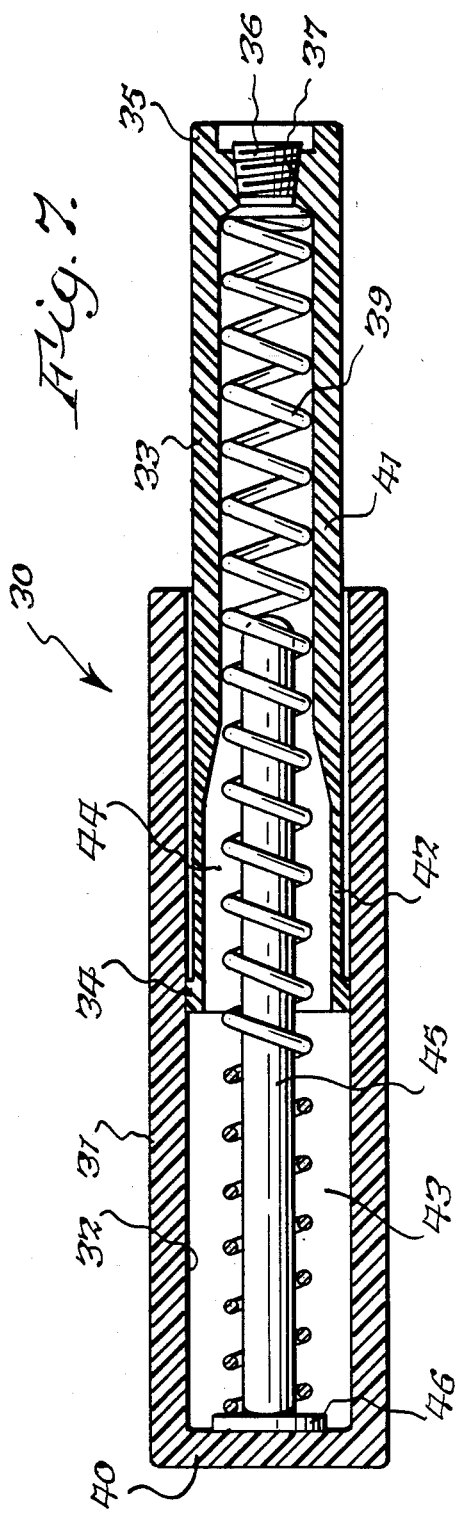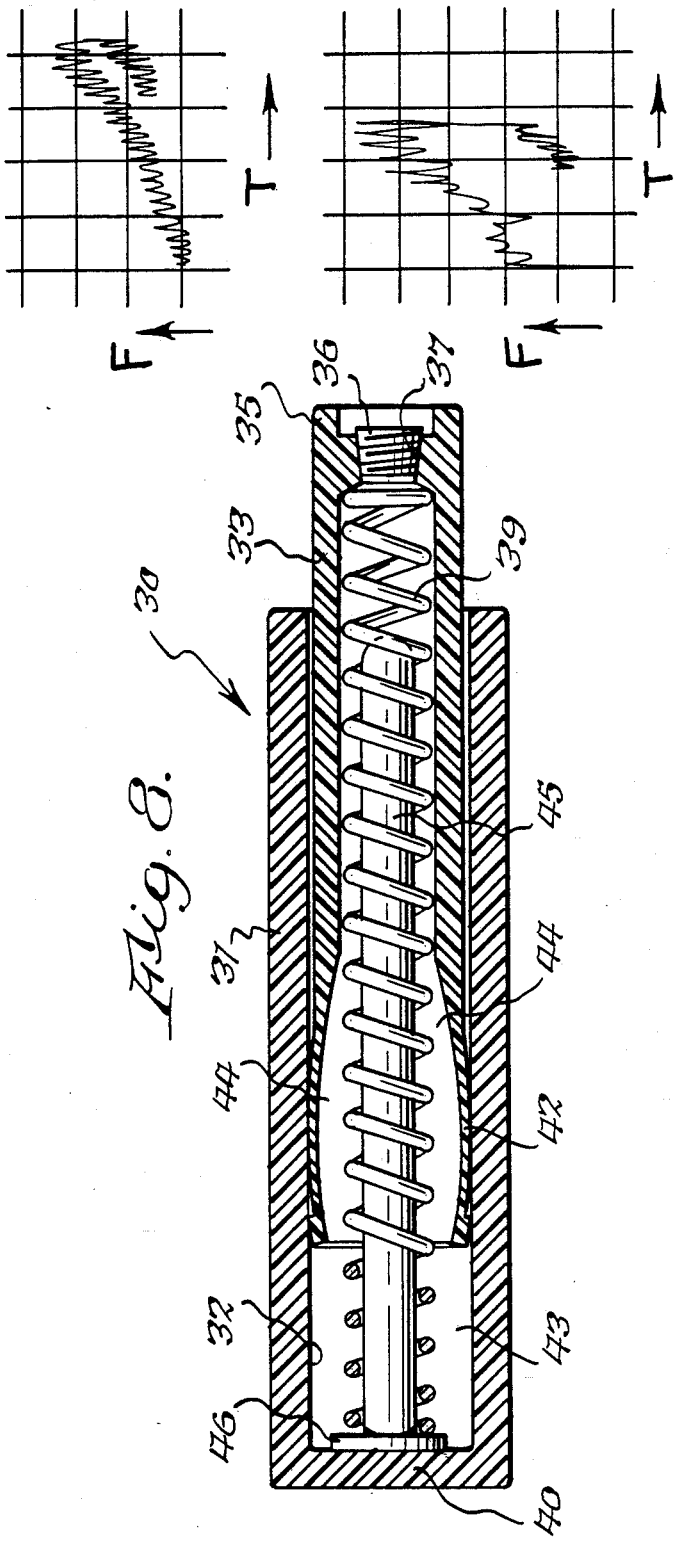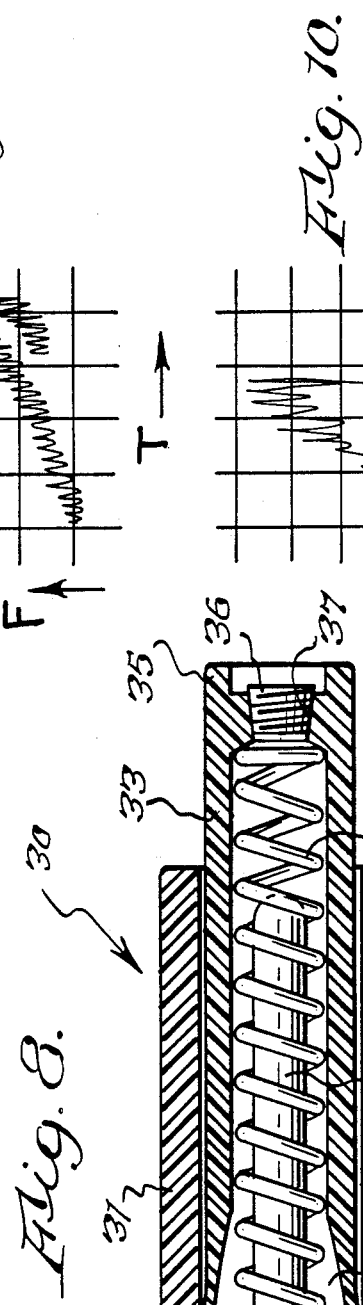

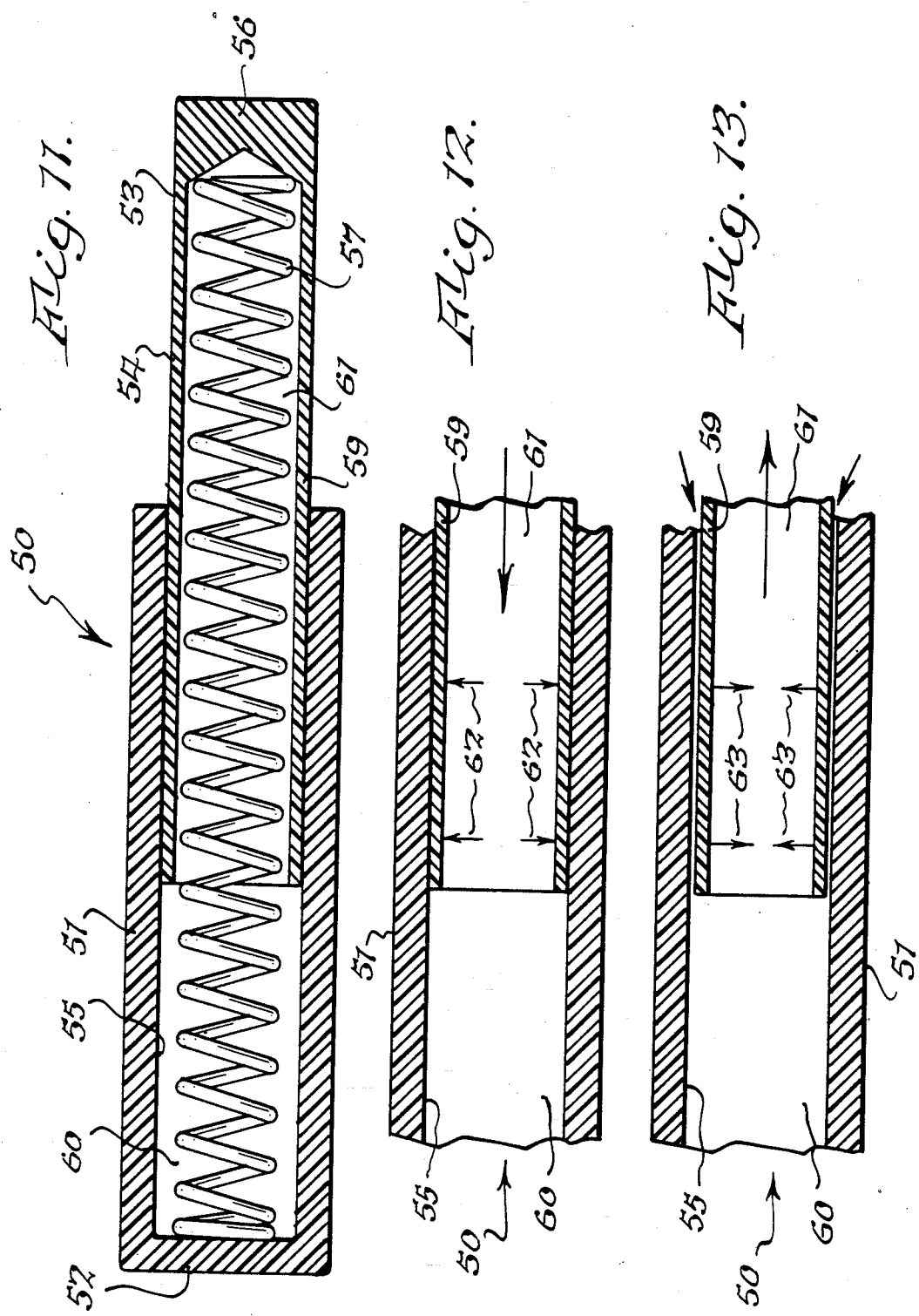

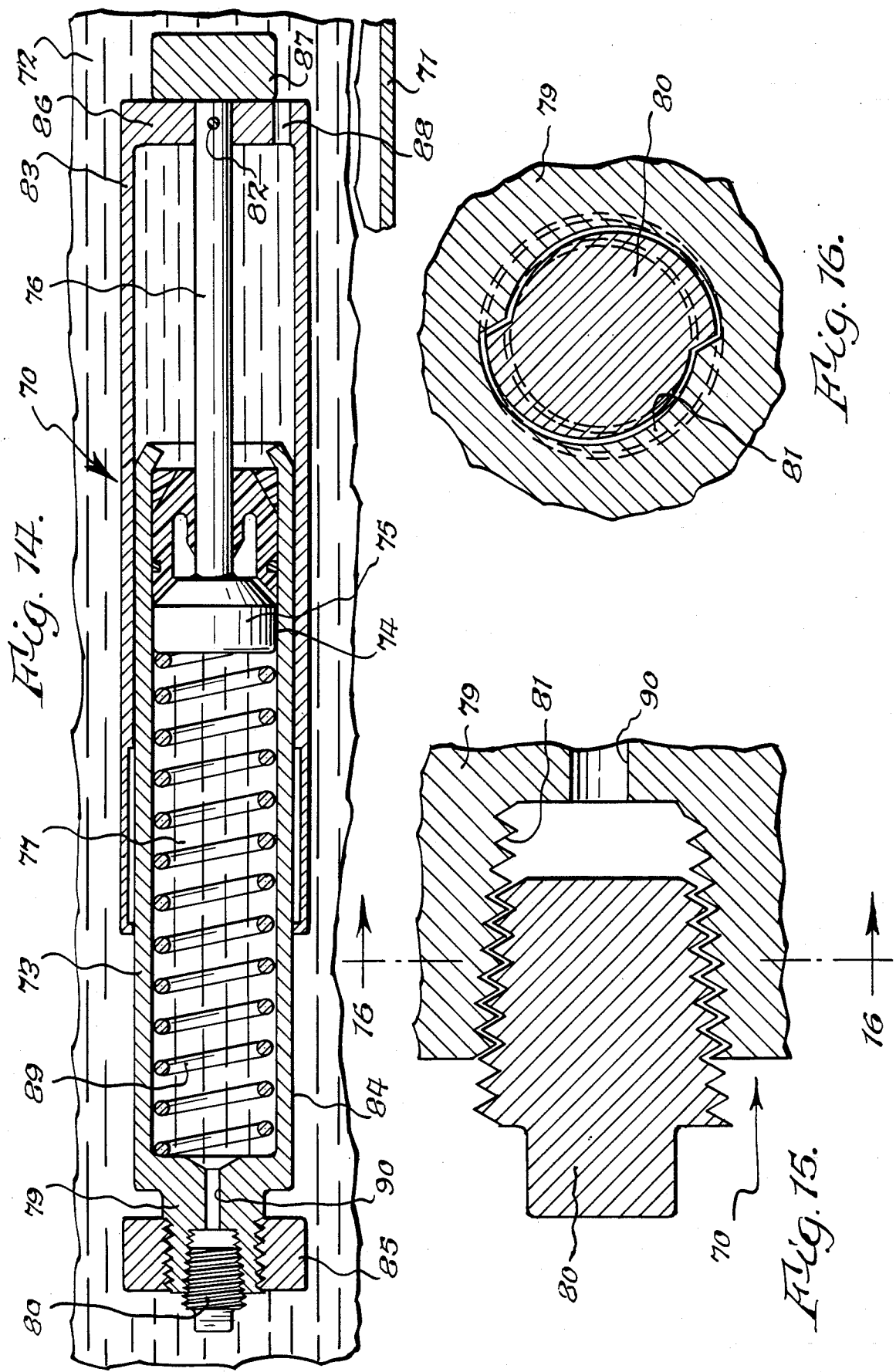

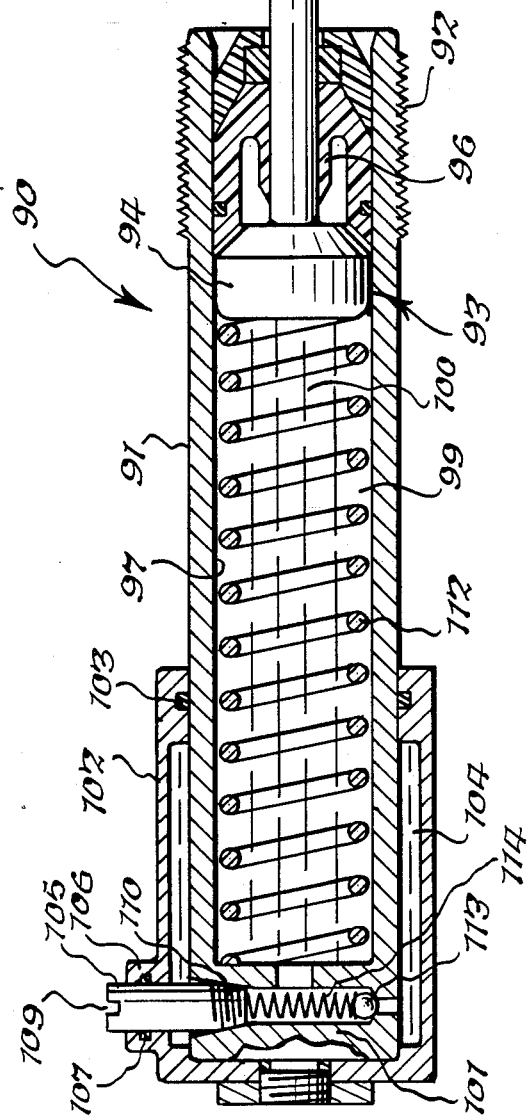
Fig. 17.
Fig. 18.
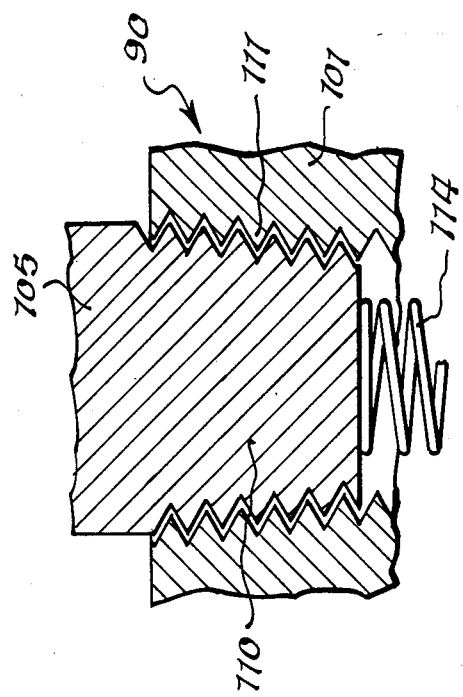
| NO OF TURNS | ADJUSTMENT COMPARISON DROP IN SECS. | |
|---|---|---|
| | TAPERED NEEDLE | THREADED PLUG |
| 0 | 91.35 | 91.35 |
| 1/4 | 9.71 | 67.92 |
| 1/2 | 1.14 | 55.81 |
| 3/4 | | 49.91 |
| 1 | | 41.86 |
| 1 1/4 | | 38.17 |
| 1 1/2 | | 22.88 |
| 1 3/4 | | 9.01 |
| 2 | | 8.56 |
| 2 1/4 | | 4.49 |
| 2 1/2 | | 2.46 |
| 2 3/4 | | 1.63 |
| 3 | | 1.57 |
| 3 1/4 | | 1.14 |
| 3 1/2 | | 1.07 |
| 3 3/4 | | 1.03 |
Fig. 23.

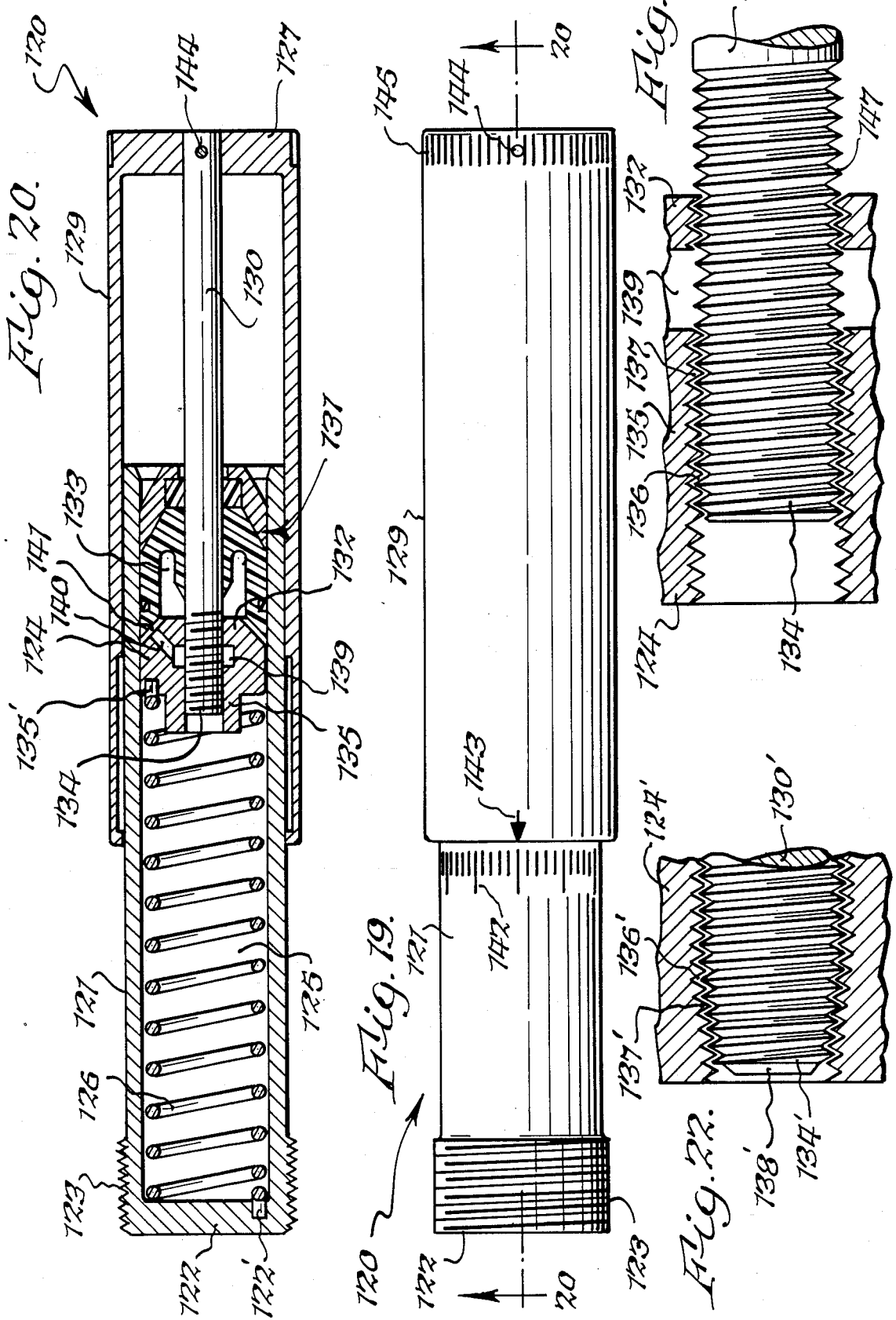

FLUID SHOCK ABSORBER CONSTRUCTIONS

This application is a continuation of application Ser. No. 125,297, filed Nov. 25, 1987, now abandoned.

BACKGROUND OF THE INVENTION

The present invention relates to an improved adjustment structure for varying the capacity of fluid shock absorbers of both the pneumatic and liquid types, and it also relates to improved pneumatic and liquid shock absorbers which provide increased shock absorbing capacities because the pistons therein expand relative to their associated cylinders during operation to add a frictional shock absorbing force to the force due to the action of the fluid therein.

By way of background, in the past needle valves and the like were used to adjust the bleed from shock absorbers to vary their shock absorbing capacity. However, needle valves had a very limited range of operation because the fluid which was being forced out of the shock absorber traveled substantially axially relative to the needle valve. In addition, insofar as known, fluid shock absorbers, both of the liquid and pneumatic types, relied solely on the restriction of movement of fluid to produce a shock absorbing action. Furthermore, pneumatic shock absorbers could only operate in a limited low force range whereas hydraulic shock absorbers could generally only operate in a limited high force range. There was, however, a range between the high force and low force ranges that it was difficult to obtain adequate shock absorption with a relatively low cost, simple shock absorber of the pneumatic type.

SUMMARY OF THE INVENTION

It is accordingly one object of the present invention to provide an improved fluid shock absorber, both of the pneumatic or liquid type which possesses an improved adjustable bleed construction which is capable of providing infinitely variable adjustments to its shock absorbing capacity.

Another object of the present invention is to provide an improved fluid shock absorber in which the shock absorbing action due to fluid restriction is supplemented by a frictional shock absorbing action to permit relatively small shock absorbers to absorb forces which are normally absorbed by larger shock absorbers.

A further object of the present invention is to provide a pneumatic shock absorber which both utilizes air and friction for providing a shock absorbing capacity and in which the air used for the shock absorbing requirements cools the heat generated by the friction which is experienced during shock absorption.

Yet another object of the present invention is to provide an improved shock absorber utilizing air which can have its internal volume changed simply to thereby permit standard sized of pistons and cylinders to be modified to produce different spring and shock absorbing capacities.

Still another object of the present invention is to provide an improved fluid shock absorber in which a variable bleed arrangement is of a configuration to provide fluidic dampening in all adjusted positions thereof.

A still further object of the present invention is to provide an extremely simple construction for both liquid and pneumatic types of shock absorbers. Other objects and attendant advantages of the present invention will readily be perceived hereafter.

The present invention relates to a shock absorber comprising a cylinder, a chamber in said cylinder, fluid in said chamber, piston means for movement into said cylinder to increase the pressure of said fluid, and adjustable bleed means for varying the flow of said pressurized fluid relative to said chamber, said bleed means comprising threaded plug means rotatably mounted in a tapped hole in one of said cylinder or said piston means for varying its spacing with said tapped hole to thereby vary the rate of said flow of said fluid through said bleed means.

The present invention also relates to a shock absorber comprising a cylinder, a first chamber in said cylinder, fluid in said chamber, a hollow tubular member having a wall and an open end located within said chamber, an inner surface on said cylinder, an outer surface on said wall of said tubular member for sliding engagement with said inner surface of said cylinder, said hollow tubular member defining a second chamber in communication with said first chamber through said open end of said hollow tubular member, said hollow tubular member being movable into said cylinder to thereby function as a piston to pressurize said fluid in said first and second chambers, said wall of said hollow tubular member being expandable to create increases of friction between said outer surface of said hollow tubular member and said inner surface of said cylinder in response to said increase of pressure within said second chamber to thereby supplement the shock absorption resulting from said increase of pressure of said fluid in said first and second chambers, said wall of said hollow tubular member returning to an unexpanded condition when said hollow tubular member moves out of said cylinder to thereby permit fluid to enter said first and second chambers through the clearance between said inner and outer surfaces. The various aspects of the present invention will be more fully understood when the following portions of the specification are read in conjunction with the accompanying drawings wherein:

BRIEF DESCRIPTION OF THE DRAWINGS

FIG. 1 is a cross sectional view taken substantially along line 1—1 of FIG. 3 and showing one embodiment of the improved shock absorber of the present invention;

FIG. 2 is a fragmentary enlargd cross sectional view of the left portion of FIG. 1;

FIG. 3 is an end elevational view taken in the direction of arrows 3—3 of FIG. 1;

FIG. 4 is a diagram indicating the expanding opening provided by a frustoconical bleed plug when it is in a relatively closed position;

FIG. 5 is a diagram similar to FIG. 4 but showing the larger expanding opening provided by the frustoconical bleed plug when it is in a relatively open position;

FIG. 6 is a fragmentary cross sectional view similar to FIG. 2 but showing a modified bleed arrangement utilizing a threaded cylindrical bleed plug;

FIG. 7 is a cross sectional view of another embodiment of a pneumatic shock absorber having flexible walls on the piston for providing a frictional engagement with the cylinder during shock absorbing action and having a variable bleed structure in the piston and having a pin within the cylinder for both guiding the spring and acting as bottoming stop and for reducing the volume within the cylinder;

FIG. 8 is a view similar to FIG. 7 but showing the flexible piston wall expanded to provide frictional engagement with the cylinder when it has been pushed into the cylinder during shock absorbing action;

FIG. 9 is a representation of an oscilloscope showing the force versus piston travel of a pneumatic shock absorber having a conventional conical bleed needle;

FIG. 10 is a view similar to FIG. 9 but showing an oscilloscope representation of force versus travel of a pneumatic shock absorber utilizing a frustoconical threaded bleed plug type of bleed and the friction dampening of the present invention;

FIG. 11 is a cross sectional view similar to FIGS. 1 and 7 but showing another embodiment of a pneumatic shock absorber which does not utilize a bleed plug and in which the piston has a flexible wall without a lip at the outer end thereof;

FIG. 12 is a fragmentary view similar to FIG. 11 but showing diagrammatically how the flexible piston wall expands as it is moved into its associated cylinder during shock absorbing action;

FIG. 13 is a fragmentary diagrammatic cross sectional view similar to FIG. 12 but showing how the ambient air moves into the cylinder as the piston wall contracts during its movement out of the cylinder;

FIG. 14 is a fragmentary cross sectional view showing a liquid-type shock absorber having the improved frustoconical bleed arrangement of FIG. 1 and which is immersed in a body of liquid;

FIG. 15 is a fragmentary enlarged cross sectional view of the frustoconical bleed portion of FIG. 14;

FIG. 16 is a fragmentary cross sectional view taken substantially along line 16—16 of FIG. 15;

FIG. 17 is a fragmentary cross sectional view of another embodiment of a liquid-type shock absorber which utilizes a frustoconical bleed plug and which also has a self-contained liquid reservoir;

FIG. 18 is an enlarged fragmentary cross sectional view of the frustoconical bleed plug portion of FIG. 17;

FIG. 19 is a side elevational view of another embodiment of a liquid-type shock absorber having a variable helical bleed for adjusting its shock absorbing capacity;

FIG. 20 is a cross sectional view taken substantially along line 20—20 of FIG. 19;

FIG. 21 is a fragmentary enlarged view of the bleed adjustment of FIG. 20;

FIG. 22 is a fragmentary enlarged cross sectional view of a frustoconical bleed type of adjustment which can be incorporated into the embodiment of FIGS. 19-21; and FIG. 23 is a table comparing the shock absorbing capacities of a shock absorber using a conical needle bleed and comparable shock absorber using the frustoconical threaded bleed plug of the present invention.

DESCRIPTION OF THE PREFERRED EMBODIMENTS

The improved pneumatic shock absorber 10 of FIGS. 1-5 includes a plastic cylinder 11 having an outer threaded periphery 12 for mounting on an associated structure. A tubular plastic piston 13 includes a closed end wall 14 which receives an external force for moving piston 13 into cylinder 11 during shock absorbing action. Piston 13 includes an annular lip 15 which is in sliding engagement with internal wall surface 16 of cylinder 11. A helical coil spring 17 has one end bearing against end wall 14 and the other end bearing against frustoconical helically threaded bleed plub 19. Spring 17 biases piston 13 in a direction out of cylinder 11. Frustoconical threaded bleed plug 19 threadably engages mating frustoconical helical threads 20 of the tapered hole in the end portion 21 of cylinder 11. A hexagonal depression 22 in the end of tapered bleed plug 19 is receiving an Allen wrench for threading it axially in both directions depicted by arrow 23 into and out of cylinder 11.

The frustoconical threaded bleed plug 19 in conjunction with the associated frustoconical threads 20 provide an extremely simple variable bleed arrangement for adjusting the shock absorbing capacity of the shock absorber in very small increments. In this respect, the cylinder 11 includes a chamber 24 and the piston 13 includes a chamber 25 which is in communication with chamber 24 through the open end of the piston. Air occupies these chambers. When the piston 13 is moved into cylinder 11 during shock absorbing action, the air in chambers 24 and 25 is compressed and is forced through the helical path defined by tapered bleed plug 19 and its associated thread in cylinder 11. The distance that the air which is being expelled travels is determined by the length of the helical path between the threaded portions of the plug and the cylinder. This helical path is much longer than an axial path which would be obtained between an unthreaded tapered pin and an associated bore, thus providing a greater resistance to air flow. The conical shape 19a of plug 19 provides an entrance suitable for a fluid amplified entrance flow and the enlarging tapered orifice provided by the conical shape and the abrupt fluid exit 19b provides for fluid amplified flow similar to my patent No. 3,722,640 due to the capillary equivalent of the thread clearance.

FIG. 4 diagrammatically depicts the opening between threaded portion 20 and the threads on plug 19 when the plug is in a relatively closed postion. It can be seen that the opening between the threads at the right end 26 of plug 19 is relatively small and the opening between the threads at the left end 27 is relatively large. This expanding opening produces a fluidic dampening type of action which tends to produce a more desirable square energy wave wherein the shock absorbing capability remains more constant throughout the stroke. When the bleed plug 22 is moved in a direction out of the cylinder, the opening therebetween is depicted by FIG. 5 which shows that the expanding opening is of greater size than in FIG. 4 wherein plug 19 was in a more closed position. However, since the opening expands in the same manner as described relative to FIG. 4, a fluidic dampening type of action is obtained, but since the bleed opening is larger than in FIG. 4, less shock absorbing capacity is obtained.

When the force which moved piston 13 into cylinder 11 is removed, spring 17 will expand to move piston 13 out of the cylinder. During this action, there will be a damping action because the ambient air has to be pass into chambers 24 and 25 through the space between plug 19 and cylinder 21 in the above-described helical path determined by the threads, and thus there will be a damping action.

The outer end of piston 13 can be modified as shown at 29 to include an attachment structure for attaching it to an external member. In this respect, a pin (not shown) from an external member may be inserted into aperture 30. In this event, the abutting force may be applied to the remote end of cylinder 11, or cylinder 11 may also be attached to another external member whereupon the shock absorber 10 will be firmly connected to two external members.

The use of the frustoconical threaded bleed construction described above is a structure for providing a simple repeatable extremely accurate means for adjusting the shock absorbing capacity minute amounts by providing an infinitely adjustable resistance to the flow of air from the shock absorber. Furthermore, because of the simplicity of the shock absorber, it can be produced at a very low cost. In addition, the shock absorbing capacity and damping capacity of shock absorber 10 can be varied by simply varying the strength of spring 17. In this respect, a stronger spring will give a greater shock absorbing capacity as piston 13 is moved into cylinder 11, and this stronger spring will also give good dampening on expansion because of the vacuum which is created when the air has to flow back into chambers 24 and 25 through the bleed arrangement and piston clearance. It will also be appreciated that by virtue of the fact that spring 17 extends between end wall 14 and bleed plug 19, it occupies substantially the entire length of the shock absorber and thus there is sufficient space for a large soft coil spring to produce a lower spring rate, or for a longer stroke high force coil spring. Further, in view of the large overlapping portions of the piston 13 and cylinder 11, shock absorber 10 provides a rugged arrangement which will be capable of absorbing side loads while providing a sliding bearing surface between the two components. While the embodiment of FIGS. 1-5 has been described as a pneumatic shock absorber, it will be appreciated that it can function as an hydraulic shock absorber if it is immersed in a body of hydraulic fluid, as described hereafter relative to FIG. 14.

In FIG. 6 a fragmentary cross sectional view of a modified embodiment of the device of FIGS. 1-5 is shown. In this embodiment the cylinder 11', which is analogous to cylinder 11 of FIG. 1, includes a cylindrical tapped portion 20' which receives cylindrical bleed plug 19' having a helical thread 18 on its outer surface. Plug 19' also includes a hexagonal depression 22' for receiving an Allen wrench for moving plug into and out of cylinder 11'. Plug 19' will provide most of the advantages of plug 19 of FIGS. 1-5 except that it will not quite provide the characteristics described above relative to FIGS. 4 and 5 wherein there is a progressively larger tapered opening between the threads as the plug is moved axially out of the cylinder. In other words, the structure of FIG. 6 will provide a helical opening of diminishing length for the passage of air out of chamber 24' of cylinder 11', and thus it will provide almost as large a range of minute adjustments. When plug 19' is screwed all the way into threads 20', the annular end 21' of plug 19' will abut annular shoulder 28' of cylinder 11' to provide a complete closure to the end of the cylinder. The same effect is achieved by frustoconical plug 19 of FIGS. 1-5 when it is screwed tight into its associated threaded bore.

In FIGS. 7 and 8, a modified embodiment of the present invention is disclosed which not only provides the type of shock absorbing capability of the embodiment of FIGS. 1-5 but also addes thereto a friction capability which causes the pneumatic shock absorber to also have some characteristics of a shock absorber which utilizes liquid therein. In other words, the embodiment of FIGS. 7 and 8 has a much higher shock absorbing capacity than a conventional pneumatic shock absorber, as shown in FIGS. 9 and 10. Shock absorber 30 includes a cylinder 31 having a cylindrical bore 32 therein for receiving piston 33 in sliding engagement. In this respect, an annular lip 34 normally engages bore 32 to provide a seal therewith. Piston 33 includes an end wall 35 which carries a frustoconical threaded plug 36 which is threadably mounted in threaded frustoconical bore 37 to provide variable bleed openings as described above relative to FIGS. 1-5.

A helical spring 39 has one end bearing against end wall 35 and its opposite end effectively bearing against end wall 40 of cylinder 31. Spring 39 functions in the same manner as spring 17 of FIGS. 1-5. The wall 41 of piston 33 includes a portion 42 of reduced diameter which is more flexible than the remaining portion of wall 41. Thus when piston 33 is moved into cylinder 31 during shock absorbing action, piston wall portion 42 will tend to bow outwardly as depicted in FIG. 8 to thus provide a frictional resistance to piston movement in addition to the shock absorbing resistance provided by the compression of air in chamber 43 of the cylinder and chamber 44 of the piston. The cylinder 31 may be threaded about its entire outer periphery as shown in FIGS. 1-3 and piston 33 may have a fastening member on its end wall 35 of the type depicted by member 29 of FIG. 1. It is to be especially noted that the bleed plug 36 is located in piston end wall 35 as an alternate to being located in the cylinder end wall as shown in FIG 1. This concentration is desirable where the end wall 40 of FIGS. 7 and 8 is inaccessible for permitting adjustment of the bleed plug.

In the embodiment of FIGS. 7 and 8, an elongated pin 45 has a base 46 which is secured to end wall 40. Pin 45 serves a multiplicity of functions. Primarily it is used to decrease the volume of chambers 43 and 44 to thereby provide a higher shock absorbing capacity to shock absorber 30. Furthermore, by varying the volume occupied by pin 45, the shock absorbing capacity of a shock absorber 30 having given dimensions can be varied. In addition, the pin 45 acts as a guide for the left end portion of spring 39, thereby permitting an extremely soft spring to be used when it is required. When a pin, such as 45, is used within the shock absorber, it provides a quicker rise to the pressure of the air in the shock absorber because there is less air to be compressed. Member 45 can also serve as a bottoming stop which carries runaway loads through to the cylinder base to avoid damaging the shock absorber. In this respect, the material of the cylinder and the piston may be fabricated from material such as polyurethane or HYTREL which have a high spring rate so that when the outer end of piston 33 engages the end of pin 45 during bottoming, the shock absorber will have a high spring rate bottoming resistance. Furthermore, a shock absorber of the type depicted in FIGS. 7 and 8 which has the supplemental frictional resistance discussed above bridges the gap between light-duty pneumatic shock absorbers and heavy-duty hydraulic shock absorbers because it can provide shock absorbing capacities in a range which is normally not obtainable by simple pneumatic shock absorbers.

FIGS. 9 and 10 show the actual test differences between the force versus travel of a conventional pneumatic shock absorber and a comparable one having the friction feature of FIGS. 7 and 8 obtained by adjusting the bleed plug. It can readily be seen that the shock absorbing force (F) of the latter is greater for each increment of piston travel (T), and that the latter has a much greater overall resistance to shock force so that the energy under the curve is greater.

In the embodiments of FIGS. 1-5 and FIGS. 7-8, the cylinders may be fabricated of metal or of any suitable rigid plastic material which includes but is not limited to epoxy, nylon or Delrin. Furthermore, in the embodiment of FIGS. 1-5 the piston 13 may be fabricated of similar material. However, in the embodiments of FIGS. 7 and 8, the piston 33 may be fabricated of a more flexible elastomeric solid which includes but is not limited to polyurethane, silicon or HYTREL. This semi-rigid elastomer provides the wll deflection discussed above which produces the friction as the air within chambers 43 and 44 is compressed during movement of piston 33 into cylinder 31. Furthermore, the coefficient of friction of cylinder 31 and/or piston 33 may be varied by suitable compounding to tailor the shock absorber 30 for specific requirements. In other words, when the friction between cylinder 31 and piston 33 is relatively low, there will be a relatively small additive frictional shock absorbing capacity, and when the friction is relatively high, there will be a relatively large additive frictional shock absorbing capacity.

In FIGS. 11-13 shock absorber 50 is shown which comprises a still further embodiment of the present invention. Shock absorber 50 includes a plastic cylinder 51 which has end wall 52 thereon. A piston 53 has an outer surface 54 which is in sliding mating engagement with internal surface 55 of cylinder 51. Piston 53 has an end wall 56 against which one end of coil spring 57 bears, and the other end of coil spring 57 bears against end wall 52 of cylinder 51 to thereby bias piston 53 outwardly of cylinder 51.

The embodiment of FIGS. 11-13 does not have the frustoconical plug-type of adjustable bleed arrangement disclosed in FIGS. 1-5 and FIGS. 7-8. The wall 59 of piston 56 is fabricated from a semi-rigid flexible plastic material such as described above relative to FIGS. 7-8. This flexibility provides a frictional resistance to the movement of piston 53 into cylinder 51 during shock absorbing action and thus produces an addition to the shock absorbing capacity which is obtained as a result of the compression of air within chambers 60 and 61. This is graphically depicted in FIG. 12 wherein the wall 59 expands as shown by arrows 62 as the air in chambers 60 and 61 is compressed. However, when the force which is moving piston 53 into cylinder 51 is released, the piston wall 59 will contract as shown by arrows 63, and thus ambient air from the atmosphere will travel as shown by arrows 64 into the annular space 65 between surface 54 of piston 53 and surface 55 of cylinder 51. A small fixed bleed orifice hole may be employed for specific flow restriction in this embodiment. This ambient air will cool the piston and the cylinder and thereby reduce their temperature which rose as a result of the compression of the air and the above-described frictional engagement.

The embodiment of FIGS. 11-13 may, if desired, incorporate all of the structural features discussed above relative to FIGS. 1-8 in addition to the features which are specifically unique to FIGS. 11-13 and which do not exclude the use of the other features. In this respect, if desired, frustoconical bleed plugs may be installed in end walls 52 or 56 as described above relative to the other embodiments. Furthermore, a pin, such as 45 such as shown in FIGS. 7 and 8, may be installed in the embodiment of FIG. 11. The advantage of the embodiment of FIG. 11 is that the piston 53 is a plain hollow cylindrical member which does not require a reduced end portion, such as shown in FIGS. 7 and 8, and which does not require the lip of FIGS. 1-5 and FIGS. 7-8, and can thus be fabricated in an extremely simple manner. Further because it is of uniform cross section throughout, it will provide a longer area of frictional engagement with the associated cylinder.

In FIGS. 14-16 a further modified embodiment of the present invention is disclosed. The liquid-type shock absorber 70 is intended to be installed in a tank 71 which contains liquid 72. Shock absorber 70 includes a cylinder 73 having a piston assembly 74 therein which includes a piston head 75 and a piston rod 76. A chamber 77 contains the same liquid 72 which is contained in tank 71. The end wall 79 of cylinder 73 has a frustoconical bleed plug 80 therein which coacts with internally threaded frustoconical threads 81 in end wall 79. The frustoconical bleed plug 80 functions in the same manner as described above relative to FIGS. 1-5 and FIGS. 7-8.

One end of piston rod 76 is attached to piston head 75 and the other end is attached at 82 to casing 83 which is slidably mounted on the outer surface 84 of cylinder 73. The end wall 79 of cylinder 73 is threaded into an external member 85. When a shock force is applied to end wall 86 of casing 83 by external member 87, piston head 74 will be moved into cylinder 73 against the bias of spring 89 which extends between piston head 74 and end wall 79. This will force liquid through bore 90 and through the helical bleed path provided by frustoconical threaded plug 80 and tapped frustoconical bore 81. When the external force is released, spring 89 will expand and the liquid 72 from tank 71 will bleed back into chamber 77 of cylinder 84 through the bleed opening provided by plug 80. The chamber within casing 83 which surrounds piston rod 76 is in communication with the liquid 72 of tank 71 through port 88 of the casing.

While the embodiment of FIG. 14 has been depicted as immersed in a tank of liquid, such as hydraulic fluid or transmission fluid used in vehicles, it will be appreciated that a shock absorber of generally the same configuration shown in FIG. 14 may be used in the ambient atmosphere to operate with air rather than hydraulic fluid. Furthermore, relative to an air shock absorber, the casing 83 may be eliminated because the shock absorber would not be subject to the same side stresses that a liquid shock absorber experiences.

In FIGS. 17 and 18 a still further embodiment of the present invention is disclosed. The shock absorber 90 contains both hydraulic liquid and the above-described frustoconical bleed arrangement, and it is also self-contained rather than being immersed in a body of liquid as shown in FIGS. 14-16. More specifically, shock absorber 90 includes a cylinder 91 which has a threaded portion 92 for attachment to an external body. A piston assembly 93 includes a piston head 94 and a piston rod 95 attached thereto which passes through seal 96 which is suitably retained within the cylinder 91. Piston head 94 rides along internal cylinder wall 97 which defines chamber 99 containing liquid 100 therein. Cylinder 91 includes an end wall 101. A housing 102 is mounted on cylinder 91 and it is in sealed engagement therewith by O-ring 103. The space between housing 102 and cylinder 91 comprises an annular chamber 104. A pin 105 is rotatably mounted in neck 106 of housing 102, and it is sealed therewith by O-ring 107. The outer end of pin 105 includes a screwdriver slot 109 and the inner end of pin 105 has a frustoconical threaded portion 110 which is in threaded mating engagement with internally tapped frustoconical portion 111 of cylinder 91. Thus when pin 105 is threaded into and out of end wall 101, the metering path between frustoconical plug 110 and threads 111 may be adjusted to vary the shock absorbing capacity of shock absorber 90 as piston head 94 is driven into cylinder 91 by an external force which is applied to piston rod 95. The structure and advantages of the frustoconical bleed plug 110 are the same as discussed above relative to the other embodiments of the present invention which utilize analogous structure.

During shock absorbing action as the piston head 94 is driven into chamber 99, the liquid 100 will be metered into chamber 104 through the helical path between bleed plug 110 and threads 111, and spring 112 will be compressed. After the force which caused the shock absorbing action has been removed, spring 112 will expand to move piston rod 95 out of cylinder 91, and at this time ball check valve 113 will be unseated against the bias of spring 114 to permit liquid which was forced into chamber 104 by the shock absorbing action to return to chamber 99 of cylinder 91.

In FIGS. 19-21 another embodiment of the present invention is disclosed. The liquid type of shock absorber 120 includes a cylinder 121 having an end wall 122 and an outer threaded portion 123 for attaching cylinder 121 to an external object. Piston head 124 is mounted for movement into chamber 125 against the bias of spring 126 when a force is applied to end wall 127 of casing 129 which slides on the outer surface of cylinder 121. End wall 127 is attached to piston head 124 by piston rod 130 which extends through seal 131 which is suitably retained within cylinder 121. By eliminating coil spring 126 and filling chamber 125 completely, and adjustable liquid spring shock can be provided.

Chamber 125 may contain any suitable fluid such as a liquid or a gas. When piston head 124 is driven into chamber 125, spring 126 will be compressed and fluid from chamber 125 will be forced through the piston head 124 into the chamber 133 behind the piston head. In this respect, the cylindrical end 134 of piston rod 130 is threaded as shown and is threadably received in portion 135 of piston head 124. A suitable gap 136 exists between the threaded piston rod end 134 and the internal threads 137 to provide a metered flow from chamber 125 into chamber 139 in the piston head and then through ducts 140 and 141 into chamber 133 behind the piston head. The cylindrical threaded end 134 also is threaded through portion 132 of the piston head; but the threaded fit with portion 132 is tighter than the threaded fit with portion 135. This will cause the part 134 located at part 135 to be centered therein. After the force which moved piston head 124 into chamber 125 is removed, spring 126 will expand to move piston head 124 back to the position shown in FIG. 20. Spring 126 has a bent end portion 127' at one end which fits into a bore in end wall 122 and the spring has a bent end portion 135' at its opposite end which fits into a bore in piston head 135'. By fastening the piston head in this manner, rotation of the piston head relative to piston rod 130 is avoided, to thereby prevent changing of the threaded relationship therebetween which could change the metering adjustment. The frictional engagement between casing 129 and cylinder 121 and between piston rod 130 and seal 131 will prevent piston rod 130 from rotating relative to piston head 124.

The helical metering path 136 may be varied in length to vary the shock absorbing capacity by screwing piston rod 130 into and out of piston head 124. In this respect, the amount that it is moved can be gauged by the calibrations 142 on the outside of cylinder 121 and the index mark 143 on casing 129. Piston rod 130 is rotated relative to piston head 124 by rotating casing 129 and thus rotating piston rod 130 because it is pinned to casing 129 at 144. To facilitate turning of casing 129, the end thereof is knurled at 145. If desired, a check valve (not shown) may be incorporated in piston head 124 which checks fluid flow when piston head 124 is moving to the left, but which unchecks to permit rapid movement of piston head 124 to the right. This type of check valve may also be incorporated into any other of the preceding embodiments, as desired or required.

In FIG. 22 a modification of the bleed adjustment of FIGS. 20-21 is disclosed. The piston rod 130' of FIG. 22 is identical in all respects to piston rod 130 of FIGS. 20-21 except that the extreme outer end of the threaded portion 134' is frustoconical with a tapered end 138' rather than cylindrical as shown in FIG. 21. The frustoconical threaded portion fits into a mating frustoconical threaded portion 137' of the piston head. However, the threaded portion (not shown) to the right of threaded portion 134' is identical to threaded portion 147 (FIG. 21) which is received in portion 132 of the piston head. Thus, the piston rod is advanced or retracted by its threaded engagement with piston head portion 132, and the helical bleed path 136' is varied in size by the axial movement of frustoconical end portion 134' relative to frustoconical threads 137'. This will produce the same type of bleed action described above relative to the other embodiments of the present invention utilizing a frustoconical bleed plug.

In FIG. 23 a table is shown comparing the shock absorbing capacities of a pneumatic shock absorber using a conical needle bleed with a comparable shock absorber using a frustoconical threaded bleed plug of the present invention. Both shock absorbers were identical except for the bleed arrangement and both had a 15/16" bore and were tested for a four inch stroke. In this respect, a two pound weight was placed on the extended piston, and the time in seconds for the piston to travel for four inches at various bleed settings was measured. The bleeds were closed at zero bleed. Thereafter the bleeds were opened in one-quarter turn increments to three and three-quarters turns, as shown in the left column labeled "turns." The turns referred to in the table are turns of the screw which moves the needle bleed and tapered plug axially. The travel time in seconds for the piston in the cylinder having a needle bleed is shown in the column labeled "needle bleed," and the travel time in seconds for the piston in the cylinder having a conical threaded plug is labeled "threaded plug." The great range of adjustability of the conical plug bleed as compared to the needle bleed is evident from the table. It can be seen that after the needle bleed after one-half turn provided no resistant to piston travel, whereas the threaded plug provided gradually decreasing resistance for up to three and threefourths turns.

Any of the above-described embodiments which discharge air to the atmosphere can function equally well submerged in an environment of liquid, and such liquids may be normal hydraulic fluid of the types used in vehicles, transmission fluid, silicone fluid, fluorocarbons or any other suitable fluid, and in such an environment the shock absorber will contain the same liquid which it pumps into and out of the body of the same liquid in which it is submerged.

While preferred embodiments of the present invention have been disclosed, it will be appreciated that it is not limited thereto but may be otherwise embodied within the scope of the following claims.

What is claimed is:

1. A fluid shock absorber comprising a cylinder, a first chamber in said cylinder, fluid in said first chamber, piston means for movement into said first chamber to increase the pressure of said fluid, and adjustable bleed means for varying the flow of said pressurized fluid relative to said first chamber, said bleed means comprising threaded plug means rotatably mounted in a tapped hole in one of said cylinder or said piston means for varying its spacing with said tapped hole by being axially threaded relative to said tapped hole to thereby vary the rate of said flow of said fluid through said bleed means, said cylinder including a cylindrical inner surface, said piston means comprising an elongated hollow tubular member having a substantially cylindrical wall and an open end located within said cylinder and having an extreme outer edge portion immediately adjacent said open end, said substantially cylindrical wall of said elongated hollow tubular member having an outer surface having a diameter which is only slightly less than the diameter of said inner surface of said cylinder for a substantial portion of the length of said inner surface of said cylinder and for a substantial portion of the length of said elongated hollow tubular member extending away from said extreme outer edge portion, said substantially cylindrical outer surface of said wall which extends away from said extreme outer edge portion being substantially parallel to said inner surface of said cylinder, and said elongated hollow tubular member defining a second chamber in communication with said first chamber through said open end of said piston means, said second chamber extending into said elongated substantially cylindrical tubular member for a substantial portion of the length thereof inwardly of said open end, and said wall of said elongated hollow tubular member being expandible for said substantial portion of its length extending away from said extreme outer edge portion to create an increase of friction between said outer surface of said elongated hollow tubular member and said inner surface of said cylinder in response to said increase of pressure within said second chamber to thereby supplement the shock absorption resulting from said increase of pressure of said fluid in said first and second chambers, said wall of said elongated hollow tubular member returning to an unexpanded condition when said elongated hollow tubular member moves out of said cylinder.

2. A shock absorber as set forth in claim 1 wherein said threaded plug means comprises a tapered plug and wherein said tapped hole comprises a tapered hole for receiving said tapered plug in mating engagement.

3. A shock absorber as set forth in claim 1 including spring means effectively located between said cylinder and said hollow tubular member for biasing said hollow tubular member in a direction outwardly from said cylinder.

4. A shock absorber as set forth in claim 3 including a pin located within at least one of said chambers for decreasing the volume thereof.

5. A shock absorber as set forth in claim 1 including attachment means on said cylinder for attaching said cylinder to an external object.

6. A shock absorber as set forth in claim 5 including second attachment means on said piston means for attachment to a second external object.

7. A shock absorber as set forth in claim 1 including spring means effectively located between said cylinder and said hollow tubular member for biasing said hollow tubular member in a direction outwardly from said cylinder.

8. A shock absorber as set forth in claim 7 including a pin located within at least one of said chambers for decreasing the volume thereof.

9. A shock absorber as set forth in claim 8 wherein said pin extends into said second chamber.

10. A shock absorber as set forth in claim 1 including a pin located within at least one of said chambers for decreasing the volume thereof.

11. A shock absorber as set forth in claim 10 wherein said pin extends into said second chamber.

12. A shock absorber as set forth in claim 1 wherein said cylinder has an end wall and wherein said threaded plug is located in said end wall.

13. A shock absorber as set forth in claim 1 wherein said piston includes an end wall, and wherein said threaded plug is located in said end wall.

14. A shock absorber as set forth in claim 1 wherein said threaded plug is cylindrical.

15. A shock absorber as set forth in claim 1 wherein said cylinder has a second open end into which said elongated hollow tubular member fits, and wherein said cylinder has a first end wall on the opposite end thereof from said second open end, and wherein said elongated hollow tubular member has a second end wall on the opposite end thereof from said open end, and wherein said second end wall is located proximate said second open end.

16. A shock absorber as set forth in claim 15 wherein said second end wall extends outwardly beyond said second open end.

17. A fluid shock absorber comprising a cylinder, a first chamber in said cylinder, fluid in said first chamber, an elongated hollow tubular member having a wall and an open end located within said chamber and having an extreme outer edge portion immediately adjacent said open end, an inner surface on said cylinder, an outer surface on said wall of said elongated hollow tubular member substantially parallel to said inner surface of said cylinder, said wall of said elongated hollow tubular member being substantially cylindrical and having an outer diameter which is only slightly less than the diameter of said inner surface of said cylinder for a substantial portion of the length of said inner surface of said cylinder and for a substantial portion of the length of said elongated hollow tubular member extending away from said extreme outer edge portion, said elongated hollow tubular member defining a second chamber in communication with said first chamber through said open end of said elongated hollow tubular member, said elongated hollow tubular member being movable into said cylinder to thereby function as a piston to pressurize said fluid in said first and second chambers, said wall of said elongated hollow tubular member being expandible for said substantial portion of its length extending away from said extreme outer edge portion to create an increase of friction between said outer surface of said elongated hollow tubular member and said inner surface of said cylinder in response to said increase of pressure within said second chamber to thereby supplement the shock absorption resulting from said increase of pressure of said fluid in said first and second chambers, said wall of said elongated hollow tubular member returning to an unexpanded condition when said elongated hollow tubular member moves out of said cylinder to thereby permit fluid to enter said first and second chambers through the clearance between said inner and outer surfaces.

18. A shock absorber as set forth in claim 17 including spring means effectively located between said cylinder and said hollow tubular member for biasing said hollow tubular member out of said cylinder.

19. A shock absorber as set forth in claim 18 wherein said cylinder includes a first end wall, and wherein said hollow tubular member includes a second end wall remote from said open end, and wherein said spring means extends between said first and second end walls and through said open end of said hollow tubular member to thereby permit the use of a spring in said shock absorber which is substantially the length thereof.

20. A shock absorber as set forth in claim 17 including pin means in one of said first and second chambers for decreasing the volume of said first and second chambers within said shock absorber.

21. A shock absorber as set forth in claim 20 wherein said cylindere includes an end wall and wherein said pin means is affixed to said end wall and extends into said first chamber.

22. A shock absorber as set forth in claim 21 wherein said pin means also extends through said open end into said second chamber.

23. A shock absorber as set forth in claim 22 including spring means effectively located between said cylinder and said hollow tubular member for biasing said hollow tubular member out of said cylinder, wherein said cylinder includes a first end wall, and wherein said hollow tubular member includes a second end wall remote from said open end, and wherein said spring means extends between said first and second end walls and through said open end of said hollow tubular member to thereby permit the use of a spring in said shock absorber which is substantially the length thereof, and wherein said spring means is located in encircling relationship to said pin means.

24. A shock absorber as set forth in claim 17 wherein said hollow tubular member includes an annular lip proximate said open end.

25. A fluid shock absorber as set forth in claim 17 wherein said elongated hollow tubular member is fabricated of semi-rigid flexible plastic.

26. A fluid shock absorber as set forth in claim 25 wherein said cylinder comprises only a second elongated hollow tubular membere having an end wall at one end thereof and a second open end at the opposite end thereof, and wherein said elongated hollow tubular member has a second end wall at the opposite end thereof from said open end, and wherein said open end faces said end wall.

27. A fluid shock absorber as set forth in claim 26 including spring means extending through said first and second chambers and bearing against said end wall and said second end wall.

28. A shock absorber as set forth in claim 17 wherein said cylinder has a second open end into which said elongated hollow tubular member fits, and wherein said cylinder has a first end wall on the opposite end thereof from said second open end, and wherein said elongated hollow tubular member has a second end wall on the opposite end thereof from said open end, and wherein said second end wall is located proximate said second open end.

29. A shock absorber as set forth in claim 28 wherein said second end wall extends outwardly beyond said second open end.

* * * * *

UNITED STATES PATENT AND TRADEMARK OFFICE
CERTIFICATE OF CORRECTION

PATENT NO. : 4,877,226
DATED : October 31, 1989
INVENTOR(S) : Paul H. Taylor It is certified that error appears in the above-identified patent and that said Letters Patent is hereby corrected as shown below:

Column 1, line 50, change "providing" to --producing--;
         line 57, change "sized" to --sizes--.

Column 3, line 62, after "Piston 13" insert --also--;
         line 66, change "plub" to --plug--.

Column 4, line 4, after "is" insert --for--.

Column 6, line 26, change "concentration" to --construction--.

Column 7, line 10, change "wll" to --wall--.

Column 9, line 33, change "and" (second occurrence) to --an--.

Column 10, line 57, change "resistant" to --resistance--.

Column 11, line 57 (claim 3), change "1" to --2--.

Column 13, line 25 (claim 21), change "cylindere" to --cylinder--.

Signed and Sealed this

Twenty-fifth Day of September, 1990

*Attest:*

HARRY F. MANBECK, JR.

*Attesting Officer*      *Commissioner of Patents and Trademarks*